US011370861B2

(12) United States Patent
Van Nuffel et al.

(10) Patent No.: US 11,370,861 B2
(45) Date of Patent: Jun. 28, 2022

(54) CHAIN EXPENDED OR BRANCHED COPOLYMERS OF VINYLIDENE AROMATIC MONOMER AND UNSATURATED COMPOUNDS WITH ELECTROPHILIC GROUPS

(71) Applicant: TRINSEO EUROPE GMBH, Horgen (CH)

(72) Inventors: Claude T. E. Van Nuffel, Oostakker (BE); Abidin Balan, Breda (NL)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 17/297,063

(22) PCT Filed: Dec. 3, 2019

(86) PCT No.: PCT/EP2019/083439
§ 371 (c)(1),
(2) Date: May 26, 2021

(87) PCT Pub. No.: WO2020/115022
PCT Pub. Date: Jun. 11, 2020

(65) Prior Publication Data
US 2021/0363279 A1  Nov. 25, 2021

Related U.S. Application Data (60) Provisional application No. 62/774,481, filed on Dec. 3, 2018.

(51) Int. Cl.
*C08F 212/08* (2006.01)
*C08J 9/00* (2006.01)
*C08J 9/12* (2006.01)

(52) U.S. Cl.
CPC ........... *C08F 212/08* (2013.01); *C08J 9/0066* (2013.01); *C08J 9/122* (2013.01); *C08F 2800/20* (2013.01); *C08F 2810/50* (2013.01); *C08J 2201/03* (2013.01); *C08J 2325/14* (2013.01)

(58) Field of Classification Search
CPC .... C08F 212/08; C08F 220/06; C08F 224/00; C08F 220/325
See application file for complete search history.

(56) References Cited

U.S. PATENT DOCUMENTS

| | | | |
|---|---|---|---|
| 5,430,101 A * | 7/1995 | Minematsu | C08L 51/04 525/73 |
| 5,473,031 A | 12/1995 | Tinetti et al. | |
| 5,663,252 A | 9/1997 | Pike et al. | |
| 6,117,961 A * | 9/2000 | Ogawa | C08J 3/24 526/347 |
| 6,214,945 B1 | 4/2001 | Pike et al. | |
| 2006/0016714 A1 | 1/2006 | Fregonese et al. | |
| 2016/0237233 A1 | 8/2016 | Hood et al. | |

FOREIGN PATENT DOCUMENTS

| | | |
|---|---|---|
| EP | 0312001 A2 | 4/1989 |
| EP | 1457518 A1 | 9/2004 |
| WO | 2009/134688 A2 | 11/2009 |
| WO | 2014/063993 A1 | 5/2014 |

OTHER PUBLICATIONS

Tinetti, Journal of Applied Polymer Science, vol. 64, Issue 4, p. 683-687, 1997 (Year: 1997).*
Montarnal, Damien, et al., "Silica-Like Malleable Materials from Permanent Organic Networks," Science, vol. 334, No. 6058, Nov. 15, 2011, pp. 965-968.
International Search Report and Written Opinion for co-pending International Application No. PCT/EP2019/083439 dated Mar. 3, 2020 (13 pages).
International Preliminary Report on Patentability for co-pending International Application No. PCT/EP2019/083439 dated Apr. 26, 2021 (12 pages).

* cited by examiner

*Primary Examiner* — Robert C Boyle
(74) *Attorney, Agent, or Firm* — Young Basile Hanlon & MacFarlane, P.C.

(57) ABSTRACT

Disclosed are such co-polymers of vinylidene substituted aromatic monomers and unsaturated compounds containing nucleophilic groups chain extended by a copolymer of one or more vinylidene aromatic monomers and one or more unsaturated compounds having pendant electrophilic groups which copolymerize with the one or more vinylidene aromatic monomers. Disclosed are compositions comprising vinylidene substituted aromatic monomers and unsaturated compounds containing nucleophilic groups and a copolymer of one or more vinylidene aromatic monomers and one or more unsaturated compounds having pendant electrophilic groups, which may optionally, contain salts of alkaline earth metals, alkali metals, transition metals, post transition metals or metalloids. Disclosed are methods of preparing such chain-extended and/or branched copolymers.

20 Claims, 2 Drawing Sheets

CHAIN EXPENDED OR BRANCHED COPOLYMERS OF VINYLIDENE AROMATIC MONOMER AND UNSATURATED COMPOUNDS WITH ELECTROPHILIC GROUPS

CROSS-REFERENCE TO RELATED APPLICATION(S)

This application is a 371 application of International Application No. PCT/EP2019/083439, filed on Dec. 3, 2019, which claims priority from U.S. Provisional Application No. 62/774,481, filed Dec. 3, 2018, the entire disclosure of which is hereby incorporated by reference.

TECHNICAL FIELD

This disclosure relates to chain extended and/or branched co-polymers of vinylidene substituted aromatic monomers and unsaturated compounds containing nucleophilic groups. Disclosed are such co-polymers of vinylidene substituted aromatic monomers and unsaturated compounds containing nucleophilic groups chain extended by a copolymer of one or more vinylidene aromatic monomers and one or more unsaturated compounds having pendant electrophilic groups. Disclosed are methods of preparing such chain-extended and/or branched copolymers.

BACKGROUND

Polymers prepared from vinylidene substituted aromatic monomers, such as styrene, find uses in a number of polymeric systems, including foams, packaging (food packaging), medical, electronic, optical, appliance and automotive applications. In certain applications, such as extruded foams from vinylidene substituted aromatic monomers, high melt strength is desired. High melt strength facilitates enhanced processing of extruded foams and foams with optimized density, compressive strength and thermal conductivity. Polymers of vinylidene substituted aromatic monomers having broad molecular weight distribution profiles exhibit differentiated rheological properties providing very high melt strength while still providing excellent processability. A number of references disclose preparing cross-linked polymer systems containing copolymers of styrene and acids, such as acrylic acid, such as US 2006/016714. These references fail to disclose how to prepare polymers of vinylidene substituted aromatic monomers having broad molecular weight distribution profiles which exhibit differentiated rheological properties providing very high melt strength while still providing excellent processability.

Thus there is a need for polymers containing vinylidene substituted aromatic monomers which exhibit broad molecular weight distribution profiles, exhibiting enhanced melt strength and excellent processability, and processes to prepare such polymers.

SUMMARY

Disclosed are compositions comprising one or more copolymers of one or more vinylidene aromatic monomers and one or more unsaturated compounds containing a nucleophilic group, the copolymers having on average about 0.02 to about 3.0 percent by weight of nucleophilic groups pendant from the copolymers, the copolymers being chain extended and or branched by one or more copolymers of one or more vinylidene aromatic monomers and one or more unsaturated compounds containing electrophilic groups wherein the chain extended and/or branched copolymers are soluble in methylene chloride at 23° C. and exhibit a polydispersity of 2.5 or greater. The concentration of nucleophilic groups on the copolymers of one or more vinylidene aromatic monomers and one or more unsaturated compounds containing a nucleophilic group, the amount of the copolymers of one or more vinylidene aromatic monomers and one or more unsaturated compounds having pendant electrophilic groups and the concentration of electrophilic groups on the copolymers of one or more vinylidene aromatic monomers and one or more unsaturated compounds having pendant electrophilic groups are chosen such that the copolymers of one or more vinylidene aromatic monomers and one or more unsaturated compounds containing a nucleophilic group are branched and or chain extended and are un-crosslinked. The nucleophilic groups may be carboxylate, carboxylic acid, hydroxyl, alcohol, phenol, amine, aniline, imidazole, tetrazole, thiol, boronic acid, glycol, hydrazine, hydroxyl amine groups, or mixtures thereof. The nucleophilic groups may be carboxylic acid groups. The electrophilic groups may be one or more of epoxide, anhydride, imide, ester, acyl halide, acyl nitrile, aldehyde, ketone, isocyanate, and isothiocyanate groups or mixtures thereof. The electrophilic groups may be epoxide groups. The chain extended and/or branched copolymer may have polymodal molecular weight distribution. The chain extended and/or branched copolymer may exhibit an Mz from about 300 kg/mole to about 1,000 kg/mole and an Mw from about 100 kg/mole to about 400 kg/mole. The chain extended and/or branched copolymer may exhibit a polydispersity of about 2.5 or greater and about 10 or less.

The composition may further comprise one or more impact modifiers, which may be materials commonly referred to as rubbers. The composition may comprise from about 50 to about 99.5 percent by weight of the chain extended and/or branched copolymer and from about 0.5 to about 50 percent by weight of the impact modifier based on the weight of the composition containing impact modifiers. The composition may comprise a continuous matrix of the chain extended and/or branched copolymer and a dispersed phase comprising rubber. The dispersed phase may comprise particles of about 0.05 to about 10.0 microns. The impact modifier may be grafted to the copolymers described herein. The copolymers may be grafted to the impact modifier. The impact modifier that is grafted to the copolymer, or that the copolymer is grafted to, may be polybutadiene.

Disclosed is a composition comprising: a) one or more copolymers of one or more vinylidene aromatic monomers and one or more unsaturated compounds containing a nucleophilic group, the copolymer having on average about 0.02 to about 3.0 percent by weight of nucleophilic groups pendant from the copolymer; and b) one or more copolymers of one or more vinylidene aromatic monomers and one or more unsaturated compounds containing electrophilic groups. The composition is reactive and when reacted as disclosed herein forms chain extended and/or branched copolymers which are soluble in methylene chloride at 23° C. and which exhibits a polydispersity of 2.5 or greater. Disclosed is a composition comprising; a) from about 90 to about 99.9 weight percent of the copolymer of one or more vinylidene aromatic monomers and one or more unsaturated compounds containing nucleophilic groups; and b) from about 0.1 to about 10.0 weight percent of the copolymer of one or more vinylidene aromatic monomers and one or more unsaturated compounds containing a electrophilic group groups. The composition may comprise a metal salt. The metal salt may be of a transition metal, post-transition metal, metalloids, alkaline earth metal or an alkali metal. The metal may be zinc, zirconium, aluminum, calcium, sodium, copper, magnesium or mixtures thereof. The metal may be zinc. The metal may form a salt with an acetate, carbonate, bicarbonate, methacrylate, fumarate or mixtures thereof. The mole ratio of metal salts to nucleophilic groups on the copolymer of one or more vinylidene aromatic monomers and one or more unsaturated compounds containing nucleophilic groups may be about 20:1 to 1:20, or about 10:1 to 1:10.

Disclosed is a method comprising: melt blending one or more copolymers of one or more vinylidene aromatic monomers and one or more unsaturated compounds containing nucleophilic groups, the copolymer having about 0.02 to about 3.0 percent by weight of nucleophilic groups pendant from the copolymer, with one or more copolymers of one or more vinylidene aromatic monomers and one or more unsaturated compounds having pendant electrophilic groups; at a temperature of about 200° C. to about 300° C. for a time period of about 0.5 to about 5 minutes wherein the copolymer of one or more vinylidene aromatic monomers and one or more nucleophilic groups is chain extended and or branched by the copolymer of one or more vinylidene aromatic monomers and one or more unsaturated compounds having electrophilic groups and the chain extended and/or branched copolymer is soluble in methylene chloride at 23° C. and exhibits a polydispersity of 2.5 or greater. The copolymer of one or more vinylidene aromatic monomers and one or more unsaturated compounds having pendant electrophilic groups is present in an amount of from about 0.1 to about 10 percent by weight of the mixture that is melt blended. The composition to be melt blended may contain one or more metal salts, as disclosed herein. The mole ratio of the metal salt to nucleophilic groups on the copolymer of one or more vinylidene aromatic monomers and one or more unsaturated compounds containing nucleophilic groups in the composition melt blended may be about 20:1.0 to about 1.0:20.

The chain extended and or branched copolymers disclosed are soluble in methylene chloride at 23° C. and exhibit a polydispersity of 2.5 or greater, about 3.2 or greater and about 4.5 or greater, and about 10 or less. The chain extended and or branched copolymers may have polymodal molecular weight distribution. The chain extended and or branched copolymers may exhibit an Mz from about 300 kg/mole to about 1,000 kg/mole and an Mw of from about 100 kg/mole to about 400 kg/mole. The chain extended and or branched copolymers disclosed may exhibit a melt viscosity at 0.314 $s^{-1}$ angular frequency of at least 10 percent higher than the same polymer without branching and chain extension when measured at 220° C. The chain extended and/or branched copolymers exhibit excellent processability and provide foams with optimized foam density, thermal conductivity and compressive strength. The chain extended and/or branched copolymers may be used to prepare extruded foams, extruded sheets, blow-molded parts, injection molded parts, thermoformed parts, and the like.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Disclosed are copolymers of one or more vinylidene aromatic monomers and one or more unsaturated compounds containing a nucleophilic group, the copolymers having on average about 0.02 to about 3.0 percent by weight of nucleophilic groups pendant from the copolymer, the copolymers being chain extended and/or branched by a copolymer of one or more vinylidene aromatic monomers and one or more unsaturated compounds containing electrophilic groups wherein the chain extended and/or branched copolymers are soluble in methylene chloride at 23° C. and exhibit a polydispersity of 2.5 or greater. Disclosed is a composition comprising: a) a copolymer of one or more vinylidene aromatic monomers and one or more unsaturated compounds containing a nucleophilic group, the copolymer having on average about 0.02 to about 3.0 percent by weight of nucleophilic groups pendant from the copolymer; and b) a copolymer of one or more vinylidene aromatic monomers and one or more unsaturated compounds containing electrophilic groups. The composition may comprise a metal salt that catalyzes the reaction of the two polymers. The composition is reactive and when reacted as disclosed herein form chain extended and/or branched copolymers which are soluble in methylene chloride at 23° C. and which exhibits a polydispersity of 2.5 or greater. Disclosed is a method of preparing such compositions. Parts a and b may be kept separate until such time as it is desired to react the two parts to form the chain extended and or branched copolymers which are branched by one or more copolymers of one or more vinylidene aromatic monomers and one or more unsaturated compounds containing electrophilic groups. Disclosed is a method wherein the copolymer of one or more vinylidene aromatic monomers and one or more nucleophilic groups is chain extended and or branched by the copolymer of one or more vinylidene aromatic monomers and one or more unsaturated compounds containing electrophilic groups. The method may be optionally performed in the presence of a metal salt which catalyzes the reaction of the two polymers. The disclosed compositions and methods provide for compositions and articles that exhibit the advantages disclosed hereinbefore.

One or more as used herein means that at least one, or more than one, of the recited components may be used as disclosed. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound. As used herein percent by weight or parts by weight refer to, or are based on, the weight of the compositions unless otherwise specified.

Chain-extended as used herein means that two or more of the subject copolymers are linked by another copolymer to form linear segments of the subject copolymers. The subject copolymers may be one or more copolymers of one or more vinylidene aromatic monomers and one or more unsaturated compounds containing a nucleophilic group. The linking copolymer may be one or more copolymers of one or more vinylidene aromatic monomers and one or more unsaturated compounds having electrophilic groups. Branched as used herein means that more than two of the subject copolymers are linked by another copolymer such that the subject polymers are formed having three or more connected chains that are not linear and form non-linear branches. The compositions disclosed may include polymer chains wherein a portion of the subject polymers are chain extended and a portion of the subject polymers are branched by the linking polymers. As used herein un-cross-linked means that the subject polymers do not have multiple crosslinks which cause the resulting polymer composition to become insoluble in solvents, for instance methylene chloride at 23° C.

The copolymers of one or more copolymers of one or more vinylidene aromatic monomers and one or more unsaturated compounds containing one or more nucleophilic groups are addition polymers formed by addition polymerization through unsaturated groups. The copolymers are chosen such that the concentration of nucleophilic groups present such that the copolymers are chain extended and/or branched copolymers when such compounds are reacted with one or more copolymers of one or more vinylidene aromatic monomers and one or more unsaturated compounds having electrophilic groups. The relative concentrations of nucleophilic groups and electrophilic groups in the reacted polymers are selected such that the copolymers react to form chain extended and/or branched polymers. If the concentration of both nucleophilic groups and electrophilic groups in the polymers is too high the resulting copolymers become crosslinked with multiple links between the reacted polymers. At least one of the two reacted polymers must have a limited number of groups to prevent crosslinking such that the resulting product is un-crosslinked. Chain extended and or branched polymers which are un-cross-linked are processable into desired products and provide the advantages discussed hereinbefore. There are a number of known copolymers of one or more vinylidene aromatic monomers and one or more unsaturated compounds having electrophilic groups which have a significant concentration of electrophilic groups and copolymers of one or more vinylidene aromatic monomers and one or more unsaturated compounds containing one or more nucleophilic groups having a high concentration of nucleophilic groups. When one of the reacted copolymers has a high concentration of either nucleophilic or electrophilic groups then the other copolymer reacted with such copolymers should have a low concentration of nucleophilic groups or electrophilic groups to allow formation of chain extended and/or branched polymer chains. At least 50% of the formed polymer chains may be un-crosslinked.

The formed chain extended and/or branched copolymers may have polymodal molecular weight distribution. Polymodal means that the polymer mixture contains more than one molecular weight peak when the molecular weight is measured. This means that the mixture may show a number of molecular weight distribution peaks at multiples of the average molecular weight of the chain extended copolymers of one or more vinylidene aromatic monomers and one or more unsaturated compounds containing a nucleophilic group. The polymer molecular weight may be measured by gel permeation chromatography (GPC) using narrow molecular weight polystyrene standards and tetrahydrofuran (THF) as solvent, standard integrating software is used together with a UV-detector.

There are several commercially available copolymers of one or more vinylidene aromatic monomers and one or more unsaturated compounds having electrophilic groups having relatively high concentrations of electrophilic groups. When these copolymers are used to chain extend and or branch copolymers of one or more vinylidene aromatic monomers and one or more unsaturated compounds containing nucleophilic groups, the concentration of the nucleophilic groups on the copolymer may be relatively low. The concentration of the nucleophilic groups on the one or more copolymers of one or more vinylidene aromatic monomers and one or more unsaturated compounds containing a nucleophilic group are chosen such that based on the concentration of electrophilic groups on the branched by one or more copolymers of one or more vinylidene aromatic monomers and one or more unsaturated compounds having electrophilic groups when the copolymers are reacted chain extended and or branched, un-crosslinked polymers are prepared. The concentration of the nucleophilic groups on the one or more copolymers of one or more vinylidene aromatic monomers and one or more unsaturated compounds containing a nucleophilic group may be about 0.02 percent by weight of the copolymer or greater, about 0.03 percent by weight or greater or about 0.04 percent by weight or greater. The concentration of the nucleophilic groups on the one or more copolymers of one or more vinylidene aromatic monomers and one or more unsaturated compounds containing nucleophilic groups may be about 3.0 percent by weight of the copolymer or less, about 1.5 percent by weight or less or about 0.5 percent by weight or less.

The concentration of the electrophilic groups on the one or more copolymers of one or more vinylidene aromatic monomers and one or more unsaturated compounds containing electrophilic groups are chosen such that based on the concentration of nucleophilic groups on the one or more copolymers of one or more vinylidene aromatic monomers and one or more unsaturated compounds having nucleophilic groups when the copolymers are reacted chain extended and or branched, un-crosslinked polymers are prepared. The concentration of the electrophilic groups on the one or more copolymers of one or more vinylidene aromatic monomers and one or more unsaturated compounds containing a electrophilic group may be about 10 percent by weight of the copolymer or greater, about 15 percent by weight or greater or about 20 percent by weight or greater. The concentration of the electrophilic groups on the one or more copolymers of one or more vinylidene aromatic monomers and one or more unsaturated compounds containing an electrophilic group may be about 60 percent by weight of the copolymer or less, about 50 percent by weight or less or about 40 percent by weight or less.

The equivalents ratio of electrophilic groups on the one or more copolymers of one or more vinylidene aromatic monomers and one or more unsaturated compounds containing a electrophilic group to the nucleophilic groups on the copolymers of one or more vinylidene aromatic monomers and one or more unsaturated compounds containing a nucleophilic group is chosen such that when the copolymers are reacted chain extended and or branched, un-crosslinked polymers are prepared. Equivalents as used in this context means the number of electrophilic groups or nucleophilic groups available to react with the other. To form the chain extended and or branched copolymers the nucleophilic groups react electrophilic groups. The extent of reaction and chain extension, branching and crosslinking is controlled by the amount of the lowest amount of the nucleophilic or electrophilic groups. The amount of nucleophilic groups may be the limiting reactive group. The amount of electrophilic groups may be the limiting reactive group. The equivalents ratio of electrophilic groups to nucleophilic groups may be about 0.1:1.0 or greater, about 0.3:1.0 or greater or 0.5:1.0 or greater. The equivalents ratio of electrophilic groups to nucleophilic groups may be about 10:1 or less, about 4:1 or less or 2:1 or less.

The copolymers disclosed herein contain vinylidene substituted aromatic monomers. Vinylidene substituted aromatic monomers comprise vinylidene, alkenyl groups, bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes; or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are herein incorporated by reference. The monomer may correspond to the formula:

Wherein $R^1$ is separately in each occurrence hydrogen or methyl; and
Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the copolymers in a sufficient amount such that the polymer exhibits the advantageous properties associated with polymers of vinylidene substituted aromatic monomers, for instance polystyrene. The advantageous properties of polymers of vinylidene substituted monomers include processability, stiffness, and thermal stability. The copolymers of one or more vinylidene aromatic monomers and one or more unsaturated compounds containing a nucleophilic group may contain vinylidene substituted aromatic monomers in an amount of about 90 percent by weight of the copolymers or greater, about 95 percent by weight or greater or about 96 percent by weight or greater. The copolymers of one or more vinylidene aromatic monomers and one or more unsaturated compounds containing a nucleophilic group may contain vinylidene substituted aromatic monomers in an amount of about 99.98 percent by weight of the polymerizable compositions or copolymers or less, about 99.97 percent by weight or less, about 99.96 percent by weight or less, about 99.0 percent by weight or less, about 98.5 percent by weight or less, or about 97 percent by weight or less, or about 96.0 percent by weight or less. The copolymers one or more copolymers of one or more vinylidene aromatic monomers and one or more unsaturated compounds having electrophilic groups may contain vinylidene substituted aromatic monomers in an amount of about 40 percent by weight of the polymerizable compositions or copolymers or greater, about 50 percent by weight or greater or about 60 percent by weight or greater. The one or more copolymers of one or more vinylidene aromatic monomers and one or more unsaturated compounds having electrophilic groups may contain vinylidene substituted aromatic monomers in an amount of about 90 percent by weight of the polymerizable compositions or copolymers or less, about 85 percent by weight or less or about 80 percent by weight or less. The recited amounts may relate to the amounts of vinylidene substituted aromatic monomers.

The compositions may contain branching agents commonly used in vinylidene aromatic based polymers. The branching agents may be vinylidene substituted aromatic monomers having 2 or more vinylidene groups. Other branching agents may include other bifunctional and in general multifunctional (functionality >2) monomers, multifunctional initiators and multifunctional chain transfer agents and the like. The branching agents may be present in polymerizable compositions in an amount of about 0.001 percent by weight of the composition or greater, about 0.002 percent by weight or greater or about 0.003 percent by weight or greater. The branching agents may be present in polymerizable compositions in an amount of about 0.5 percent by weight of the composition or less, about 0.2 percent by weight or less or about 0.1 percent by weight or less.

The one or more copolymers of one or more vinylidene aromatic monomers and one or more unsaturated compounds containing one or more nucleophilic groups comprise the addition reaction product of one or more vinylidene aromatic monomers and one or more unsaturated compounds containing one or more nucleophilic groups. The one or more unsaturated compounds containing one or more nucleophilic groups may contain one nucleophilic groups. The copolymers may contain more than one different nucleophilic group or may contain only one species of nucleophilic group. The copolymers may be prepared from more than one unsaturated compound each containing different type of nucleophilic group. The copolymers may be prepared from one species of unsaturated compounds each containing the same nucleophilic group. The one or more copolymers of one or more vinylidene aromatic monomers and one or more unsaturated compounds containing one or more nucleophilic groups may contain a mixture of copolymers that contain polymer chains of differing amounts of nucleophilic groups. Some polymer chains may contain 2 nucleophilic groups, 1 nucleophilic group or 0 nucleophilic groups. The polymer chains in the mixture may contain on average less than 2 nucleophilic groups per chain, 1 nucleophilic group per chain or 0.8 nucleophilic groups per chain. The mixture contains on average greater than 0 nucleophilic groups per chain or 0.05 or greater nucleophilic groups per chain. The nucleophilic groups may be pendant from the chain of the copolymer.

The one or more unsaturated compounds containing nucleophilic groups may contain any nucleophilic group that reacts with an electrophilic group under the conditions described herein. Nucleophilic group as used herein is a group which donates an electron pair to make a covalent bond. Exemplary nucleophilic groups include carboxylates, carboxylic acid, alcohol, phenol, amine, aniline, imidazole, tetrazole, thiol, boronic acid, glycol, hydrazine and hydroxyl amine groups. Nucleophilic groups may be carboxylic acid groups. The one or more unsaturated compounds containing nucleophilic groups may be (meth) acrylic acids, (meth) acrylates, hydroxyalkyl methacrylates, and the like. The one or more unsaturated compounds containing nucleophilic groups may be methacrylic acid and or acrylic acid.

The one or more unsaturated compounds containing electrophilic groups may contain any electrophilic group that reacts with a nucleophilic group under the conditions described herein. Electrophilic group as used herein is a group which receives an electron pair to form a covalent bond. Exemplary electrophilic groups include epoxide, anhydride, imide, ester, acyl halide, acyl nitrile, aldehyde, ketone, isocyanate and isothiocyanate groups. Electrophilic groups may be epoxide groups. The one or more unsaturated compounds containing electrophilic groups may be glycidyl (meth)acrylates, and the like.

The copolymers disclosed herein may comprise one or more (meth)acrylates. (Meth)acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. (Meth)acrylates useful include those that correspond to the formula:

wherein $R^a$ is separately in each occurrence H or —$CH_3$; and $R^b$ may be a $C_1$ to $C_{-30}$ alkyl group or $C_{1-10}$ alkyl group. Examples of the one or more (meth)acrylates include lower alkyl (meth)acrylates, such as methyl (meth)acrylate, ethyl (meth)acrylate, propyl (meth)acrylate, butyl (meth)acrylate, pentyl (meth)(acrylate) and hexyl (meth) acrylate. The one or more (meth)acrylates in the polymerizable composition may be present in sufficient amount to provide the desired properties of the copolymer such as processability, practical toughness, refractive index, environmental stress crack resistance, hydrolytic stability, thermal stability, UV stability, impact resistance, weatherability, and the like. The copolymers disclosed herein may contain (meth)acrylates in an amount of about 0 percent by weight of the copolymers or greater, about 1 percent by weight or greater or about 2 percent by weight or greater. The polymerizable compositions and copolymers disclosed herein may contain (meth) acrylates in an amount of about 20 percent by weight of the copolymers or less, about 15 percent by weight or less, about 10 percent by weight or less, about 8 percent by weight or less or about 5 percent by weight or less.

The copolymers may further comprise one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles enhance the glass transition temperature, transparency, chemical resistance and the like of the copolymers. The copolymers may contain one or more unsaturated nitriles in an amount of about 0 percent by weight of the copolymers or greater, about 1 percent by weight or greater or about 2 percent by weight or greater. The copolymers may contain one or more unsaturated nitriles in an amount of about 40 percent by weight of the copolymers or less, about 35 percent by weight or less, about 30 percent by weight or less or about 20 percent by weight or less.

Other vinyl monomers may also be included in the copolymers, in sufficient amounts to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), and the like. These additional comonomers can be incorporated in to the composition in several ways including, interpolymerization with the vinylidene substituted aromatic containing copolymer and/or polymerization into polymeric components that can be combined, for example blended in to the matrix. The amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also useful are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions may contain impact modifiers in an amount of about 0.5 percent by weight of the compositions or greater, about 1 percent by weight or greater or about 2 percent by weight or greater. The compositions may contain impact modifiers in an amount of about 50 percent by weight of the compositions or less, about 45 percent by weight or less, about 40 percent by weight or less, about 30 percent by weight or less, about 20 percent by weight or less or about 10 percent by weight or less. The compositions may contain the copolymers in an amount of about 0.5 percent by weight of the compositions or greater or 50 percent by weight of the compositions or greater. The compositions may contain copolymer in an amount of about 99.5 percent by weight of the compositions or less, 90 percent by weight of the compositions or less, 80 percent by weight of the compositions or less or 50 percent by weight of the compositions or less. Compositions as used in this context are the compositions containing all of the ingredients disclosed.

The impact modifiers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight average molecular weight of at least about 100 kilogram per mole (kg/mole)—or a weight average molecular weight of at least about a 300 kg/mole. The diene rubber may have a weight-average molecular weight equal to or less than about 900 kg/mole or a weight average molecular weight equal to or less than 600 kg/mole. The diene rubber having a solution viscosity of at least 10 centi Stokes (cSt) (10 percent (%) solution in styrene) or a solution viscosity of about 30 cSt. The diene rubber may have a solution viscosity equal to or less than about 500 cSt or equal to or less than about 400 cSt. The rubber may be dispersed in the continuous matrix phase as discrete particles. The rubber particles may comprise a range of sizes having a mono-modal, bimodal, or multimodal distribution. The average particle size of a rubber particle refers to the volume average diameter. In most cases, the volume average diameter of a group of particles is the same as the weight average. The average particle diameter measurement includes the polymer grafted to the rubber particles and occlusions of polymer within the particles. The rubber particle sizes disclosed and claimed herein may be determined on a Coulter Multisizer II or II e with the ACCUCOMP™ Software Version 2.01. by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (µm), equal to or greater than about 0.1 micrometers, and about 0.5 micrometers. The average particle size of the rubber particles may be equal to or less than about 10 micrometers, preferably equal to or less than about 5 micrometers, or equal to or less than about 4 micrometers.

The compositions may optionally contain one or more additives commonly used in compositions of this type. Such additives include, but are not limited to: ignition resistant additives, stabilizers, colorants, antioxidants, antistats, silicon oils, flow enhancers, mold releases, etc. Ignition resistance additives, include halogenated hydrocarbons, halogenated carbonate oligomers, halogenated diglycidyl ethers, organophosphorous compounds, fluorinated olefins, antimony oxide and metal salts of aromatic sulfur, or a mixture thereof. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof. Such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers may be present in amounts up to 40 weight percent based on the weight of the compositions.

Disclosed are various techniques for producing the copolymers. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525; U.S. Pat. Nos. 3,660,535; 3,243,481; and 4,239,863, all of which are incorporated herein by reference. Continuous mass polymerization techniques may be employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. A parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference. A feed with a functional additive such as ethylenebisstearamide, dialkyladipates, polydimethylsiloxane, or other lubricants or release agents that increases the processability of the product can be added in one or more locations throughout the polymerization, devolatization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to crosslink the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures may be continued until the desired conversion of monomers to polymer is obtained. The conversion may be (sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

To synthesize rubber-modified copolymers with high performance by the mass process, four aspects are important among many others. These aspects are grafting of the rubber substrate prior to phase inversion, rubbery domain and/or particle formation or sizing during phase inversion, building molecular weight and molecular weight distribution of the matrix, and cross-linking of the rubber particle at the completion point of the mass polymerization. A combination of mass and suspension polymerization techniques may be employed. Using these techniques, following phase inversion and subsequent size stabilization of the rubber particles, the partially polymerized product can be suspended with or without additional monomers in an aqueous medium that contains a polymerized initiator and polymerization subsequently completed. The rubber-modified copolymer is separated from the aqueous medium by acidification, centrifugation or filtration. The recovered product is washed with water and dried.

A polymer's molecular weight is directly related to the entanglement effects contributing to its rheological and physical properties. The molecular weight of the matrix copolymer produced in the grafting reactor during the production of the rubber-modified vinylidene aromatic substituted copolymer can be adjusted by the addition of a chain transfer agent. Chain transfer agents, or molecular weight regulators, are substances which can undergo atom or group transfer or an addition-elimination. Organic molecules with labile hydrogens and are well known, for example, alphamethyl styrene dimer, mercaptans or thiols such as n-dodecylmercaptan (nDM) and thioglycolate, disulfides, dithiauram disulfides, monosulfides, halides or halocarbons, common solvents and certain unsaturated compounds such as allyl peroxides, allyl halides, allyl sulfides, and terpenes such as terpinolene. Also transition metal complexes as cobalt (II) porphyrin complexes can be used as transfer agent. Chain transfer agents may be added in an amount from about 0.0001 to 10 weight percent based on the weight of the reaction mixture (that is, rubber, monomer(s), and solvent, if any). The chain transfer agent may be added in an amount equal to or greater than about 0.001 weight percent, about 0.002, or about 0.003 weight percent based on the weight of the reaction mixture. The chain transfer agent may be added in an amount equal to or less than about 0.5 weight percent, about 0.2, or about 0.1 weight percent based on the weight of the reaction mixture. The chain transfer agent may be added all at once in one reactor zone or it may be added in two or more reactor zones. Chain transfer agent may be added before phase inversion, during rubber particle sizing, more may be added after particle sizing to help control the matrix molecular weight, and optionally more may be added later to fine tune the matrix molecular weight/molecular weight distribution. The chain transfer agent may be added at the beginning of the polymerization in a first amount equal to or greater than 0.001 weight percent, from about 0.002 and about 0.1 weight percent, or from about 0.003 and about 0.05 weight percent based on the weight of the reaction mixture. The amount of chain transfer agent added later, for example after about 40 percent solids, 30 percent solids, is added in a second amount equal to or less than about 0.7 weight percent, about 0.001 to about 0.6 weight percent, or from about 0.002 to about 0.5 weight percent based on the weight of the reaction mixture. The molecular weight of the matrix copolymer depends on, for example, how much chain transfer agent is used and when it is added.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer may be about 100 kg/mole or greater, about 120 kg/mole or greater or about 140 kg/mole or greater. The molecular weight of the copolymer may be about 400 kg/mole or less, about 350 kg/mole or less or about 325 kg/mole or less. Molecular weight is determined by gel permeation chromatography using polystyrene standards.

The process may be performed in the presence of a radical initiator. Any radical initiator that enhances the formation of the copolymers may be used. Exemplary classes of initiators include free radical initiators such as peroxide and azo compounds which will accelerate the polymerization of the vinyl aromatic monomer. Exemplary initiators include tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis (tertiary-butylperoxy)-3,3,5-trimethyl-cyclohexane, t-butylperoxybenzoate, 1,1-bis(t-butylperoxy)-cyclohexane, benzoylperoxide, succinoylperoxide and t-butylperoxypivalate, and azo compounds such as azobisisobutyro-nitrile, azobis-2,4-dimethylvaleronitrile, azobis cyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

Disclosed is a composition useful for preparing chain extended and or branched copolymers of one or more vinylidene aromatic monomers and one or more unsaturated compounds containing nucleophilic groups, the copolymer having on average about 0.02 to about 3.0 percent by weight of nucleophilic groups pendant from the copolymer. The chain extended and or branched copolymers may be un-crosslinked. The composition comprises: a) one or more copolymers of one or more vinylidene aromatic monomers and one or more unsaturated compounds containing a nucleophilic group, the copolymer having on average about 0.02 to about 3.0 percent by weight of nucleophilic groups pendant from the copolymer; and b) one or more copolymers of one or more vinylidene aromatic monomers and one or more unsaturated compounds having electrophilic groups. The two parts may be kept separate until formation of the chain extended and or branched copolymers is desired. The formation of the chain extended and or branched copolymers may take place at a time and place remote from preparation of the copolymers. The chain extended and or branched copolymers may be formed by contacting the components, under conditions disclosed.

The uncontacted composition may include a metal salt. The metal salt may reduce the temperature at which the chain extended and or branched copolymers may be formed. The metal salt may function as a catalyst for the formation of the chain extended and or branched copolymers. Any metal salt that catalyzes or reduces the temperature required for formation of the chain extended and or branched copolymers may be utilized. The metal salt may be the salt of a transition metal, an alkali metal, an alkaline earth metal, a post transition metal or a metalloid. The metal in the salt may be zinc, zirconium, aluminum, calcium, sodium, copper, magnesium or mixtures thereof. The metal in the salt may be zinc. The metal may form a salt with an acetate, carbonate, bicarbonate, methacrylate, fumarate counter ion, or mixtures thereof. The metal may form a salt with an acetate counter ion. The metal salt may be zinc acetate, zinc acetate dihydrate, zinc carbonate, and the like.

The metal salt may be present in a sufficient amount to catalyze or reduce the temperature required for formation of the chain extended and or branched copolymers. The metal salt may be present in the reactive composition disclosed in a mole ratio relative to the one or more vinylidene aromatic monomers and one or more unsaturated compounds containing a nucleophilic group of about 20:1 to about 1:20, 10:1 to 10:1 or 5:1 to 1:5. The metal salt may be present in the reactive composition in an amount of about 10 ppm or greater based on the weight of the composition, about 50 ppm by weight or greater or about 100 ppm or greater. The metal salt may be present in the reactive composition in an amount of about 5000 ppm by weight or less based on the weight of the composition, about 3000 ppm by weight or less or about 1000 ppm by weight or less. The metal salt may be present in part a, part b or in a third part. The metal salt may be present in a matrix of a copolymer of one or more vinylidene aromatic monomers. The metal salt may be present in a third part that may include an admixture of other components useful for the use of the composition.

The one or more copolymers of one or more vinylidene aromatic monomers and one or more unsaturated compounds containing a nucleophilic group may be present in the reactive composition in an amount of about 90 weight percent or greater based on the weight or the reactive composition, about 95 weight percent or greater or about 99 weight percent or greater. The one or more copolymers of one or more vinylidene aromatic monomers and one or more unsaturated compounds containing a nucleophilic group may be present in the reactive composition in an amount of about 99.9 weight percent or less based on the weight or the reactive composition, about 99.8 weight percent or less or about 99.7 weight percent or less. The one or more copolymers of one or more vinylidene aromatic monomers and one or more unsaturated compounds containing an electrophilic group may be present in the reactive composition in an amount of about 0.05 weight percent or greater based on the weight or the reactive composition, about 0.1 weight percent or greater or about 0.3 weight percent or greater. The one or more copolymers of one or more vinylidene aromatic monomers and one or more unsaturated compounds containing an electrophilic group may be present in the reactive composition in an amount of about 10 weight percent or less based on the weight or the reactive composition, about 8 weight percent or less or about 5 weight percent or less.

Disclosed is a method of preparing chain extended and or branched copolymers of one or more vinylidene aromatic monomers and one or more unsaturated compounds containing a nucleophilic group. The method may comprise contacting one or more copolymers of one or more vinylidene aromatic monomers and one or more unsaturated compounds containing nucleophilic groups with one or more copolymers of one or more vinylidene aromatic monomers and one or more unsaturated compounds having electrophilic groups under conditions such that chain extended and or branched copolymers of one or more vinylidene aromatic monomers and one or more unsaturated compounds containing nucleophilic groups are prepared. The method may comprise contacting the copolymers in the presence of a metal salt. The amounts of the reactants may be those amounts recited.

The reactants may be contacted using any method wherein chain extended and or branched copolymers of one or more vinylidene aromatic monomers and one or more unsaturated compounds containing nucleophilic groups are prepared. Exemplary methods include melt blending, extrusion, injection molding, foam extrusion, sheet extrusion, and the like. Exemplary methods include melt blending. The temperature for reacting the reactants is selected such that chain extended and or branched copolymers of one or more vinylidene aromatic monomers and one or more unsaturated compounds containing nucleophilic groups are prepared. The reactants may be contacted at a temperature of about 200° C. or greater, or about 220° C. or greater, or about 230° C. or greater. The reactants may be contacted at a temperature of about 260° C. or less, or about 250° C. or less, or about 245° C. or less. The contacting time at the stated temperatures is selected such that chain extended and or branched copolymers of one or more vinylidene aromatic monomers and one or more unsaturated compounds containing nucleophilic groups are prepared. The contacting time of the reactants may be about 0.5 minutes or greater, about 0.6 minutes or greater or about 0.7 minutes or greater.

The contacting time of the reactants may be about 10 minutes or less, about 5.0 minutes or less or about 3.0 minutes or less. The reactants may be melt blended in an extruder, mixer, or the like. To facilitate formation of the chain extended and or branched copolymers of one or more vinylidene aromatic monomers and one or more unsaturated compounds containing nucleophilic groups it may be desirable to react the reactants at the specific energy values. The copolymers may be reacted under conditions such that the specific energy values are greater than 400 J/g or 700 J/g.

The final form of the product can be granules useful in further processes, such as forming extruded foams and sheets. Common additives used in the disclosed compositions may include fire retardants, nucleating agents, blowing agents, flow promoters, process aids, fibers, fillers, UV stabilizers, antioxidants, thermal stabilizers, colorants, blends of other polymers, etc. The pellets of the formulated composition may be extruded to form sheets. The sheets may be thermoformed into shaped articles. The formulated compositions may be molded into articles.

Disclosed are exemplary embodiments.

Embodiment 1 is a composition comprising one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, the copolymer being chain extended and or branched by one or more copolymers of one or more vinylidene aromatic monomers and one or more unsaturated compounds having electrophilic groups, wherein the chain extended and/or branched copolymer is soluble in methylene chloride at 23° C. and exhibits a polydispersity of 2.5 or greater Embodiment 2 is a composition according to Embodiment 1 wherein the concentration of nucleophilic groups on the copolymer of one or more vinylidene aromatic monomers and one or more unsaturated compounds containing a nucleophilic group, the amount of the a copolymer of one or more vinylidene aromatic monomers and one or more unsaturated compounds having pendant electrophilic groups and the concentration of electrophilic groups on the a copolymer of one or more vinylidene aromatic monomers and one or more unsaturated compounds having pendant electrophilic groups are chosen such that the copolymer of one or more vinylidene aromatic monomers and one or more unsaturated compounds containing a nucleophilic group is branched and or chain extended and is un-crosslinked.

Embodiment 3 is a composition according to Embodiment 2 wherein the chain extended and/or branched copolymer contains from about 0.1 to about 0.5 percent of one or more copolymers of one or more vinylidene aromatic monomers and one or more unsaturated compounds having pendant electrophilic groups.

Embodiment 4 is a composition according to any one of Embodiments 1 to 3 wherein the nucleophilic groups are carboxylic acid, carboxylate, alcohol, phenol, amine, aniline, imidazole, tetrazole, thiol, boronic acid, glycol, hydrazine and hydroxyl amine groups.

Embodiment 5 is a composition according to any one of Embodiments 1 to 4 wherein the electrophilic groups are one or more of epoxide, anhydride, imide, ester, acyl halide, acyl nitrile, aldehyde, ketone, isocyanate and isothiocyanate groups.

Embodiment 6 is a composition according to any one of Embodiments 1 to 5 wherein the nucleophilic groups are carboxylic acid groups.

Embodiment 7 is a composition according to any one of Embodiments 1 to 6 wherein the electrophilic groups are one or more of epoxide groups.

Embodiment 8 is a composition according to any one of Embodiments 1 to 7 wherein the chain extended and/or branched copolymer exhibits a polymodal molecular weight distribution.

Embodiment 9 is a composition according to any one of the preceding embodiments wherein the Mz of the chain extended and or branched copolymers is from about 300 kg/mole to about 1,000 kg/mole and the Mw is from about 100 kg/mole to about 400 kg/mole.

Embodiment 10 is a composition according to any one of Embodiments 1 to 9 wherein the polydispersity is about 3.2 or greater or about 4.5 or greater.

Embodiment 11 is a composition according to any one of Embodiments 1 to 10 wherein the one or more unsaturated carboxylic acids comprise acrylic acid, methacrylic acid, 4-vinyl benzoic acid, maleic acid, fumaric acid or mixtures thereof.

Embodiment 12 is a composition according to any one of the Embodiments 1 to 11 comprising one or more impact modifiers.

Embodiment 13 is a composition according to any of Embodiments 1 to 12 comprising from about 20 to about 99.5 percent by weight of the chain extended and/or branched copolymer and from about 0.5 to about 50 percent by weight of the impact modifier based on the weight of the composition.

Embodiment 14 is a composition according to any one of Embodiments 12 or 13 which comprises a continuous matrix containing the chain extended and/or branched copolymer and a dispersed phase comprising an impact modifier.

Embodiment 15 is a composition according to any one of Embodiments 9 to 11 wherein the dispersed phase comprises particles of about 0.05 to about 6.0 microns.

Embodiment 16 is a composition according to any one of the preceding embodiments wherein the copolymer of one or more vinylidene aromatic monomers and one or more unsaturated compounds containing a nucleophilic group contains from about 0.5 to about 1.5 percent by weight nucleophilic groups.

Embodiment 17 is a composition according to any one of the preceding embodiments wherein the chain extended and or branched contains polymers have a weight average molecular weight of 1,000 kg/mole or less.

Embodiment 18 is a composition according to any one of the preceding embodiments wherein the melt viscosity at $0.314\ s^{-1}$ angular frequency is at least 10 percent higher than the same polymer without branching and chain extension when measured at 220° C.

Embodiment 19 is a composition comprising:
a) one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer; and
b) one or more copolymers of one or more vinylidene aromatic monomers and one or more unsaturated compounds having electrophilic groups.

Embodiment 20 is a composition of embodiment 19 comprising;
a) from about 90 to about 99.9 weight percent of the copolymer of one or more vinylidene aromatic monomers and one or more unsaturated compounds containing nucleophilic groups; and
b) from about 0.1 to about 10.0 weight percent of the copolymer of one or more vinylidene aromatic monomers and one or more unsaturated compounds containing electrophilic groups.

Embodiment 21 is a composition according to Embodiment 19 or 20 wherein the concentration of nucleophilic groups on the copolymer of one or more vinylidene aromatic monomers and one or more unsaturated compounds containing nucleophilic groups, the amount of the a copolymer of one or more vinylidene aromatic monomers and one or more unsaturated compounds containing electrophilic groups and the concentration of electrophilic groups on the copolymer of one or more vinylidene aromatic monomers and one or more unsaturated compounds having pendant electrophilic groups are chosen such that when the copolymers are reacted they form copolymers of one or more vinylidene aromatic monomers and one or more unsaturated compounds containing nucleophilic groups which are branched and or chain extended and are un-crosslinked.

Embodiment 22 is a composition according to any one of Embodiments 19 to 21 wherein the nucleophilic groups are carboxylic acid, carboxylate, alcohol, phenol, amine, aniline, imidazole, tetrazole, thiol, boronic acid, glycol, hydrazine and hydroxyl amine groups.

Embodiment 23 is a composition according to any one of Embodiments 19 to 22 wherein the electrophilic groups are one or more of epoxide, anhydride, imide, ester, acyl halide, acyl nitrile, aldehyde, ketone, isocyanate and isothiocyanate groups.

Embodiment 24 is a composition according to any one of Embodiments 19 to 23 wherein the nucleophilic groups are carboxylic acid groups.

Embodiment 25 is a composition according to any one of Embodiments 19 to 24 wherein the electrophilic groups are one or more of epoxide groups.

Embodiment 26 is a composition of any one of embodiments 19 to 25 wherein the composition contains a salt of a transition metal, an alkali metal, an alkaline earth metal, a post transition metal or a metalloid.

Embodiment 27 is a composition of Embodiment 26 wherein the metal is zinc, zirconium, aluminum, calcium, sodium, copper, magnesium or mixtures thereof.

Embodiment 28 is a composition of Embodiment 26 or 27 wherein the transition metal, alkali metal, the earth alkali metal, the post transition metal or the metalloid forms a salt with an acetate, carbonate, bicarbonate, methacrylate, fumarate or mixtures thereof.

Embodiment 29 is a composition of any one of embodiments 26 to 28 wherein the mole ratio of metal salts to nucleophilic groups on the copolymer of one or more vinylidene aromatic monomers and one or more unsaturated compounds containing nucleophilic groups is about 20:1 to about 1:20.

Embodiment 30 is a composition of any one of embodiments 26 to 29 wherein the mole ratio of metal salts to nucleophilic groups on the copolymer of one or more vinylidene aromatic monomers and one or more unsaturated compounds containing nucleophilic groups is about 10:1 to about 1:10.

Embodiment 31 is a method of preparing a composition according to any one of Embodiments 1 to 18 comprising: melt blending one or more copolymers of one or more vinylidene aromatic monomers and one or more unsaturated compounds containing nucleophilic groups, the copolymer having on average about 0.02 to about 3.0 percent by weight of nucleophilic groups pendant from the copolymer, with one or more copolymers of one or more vinylidene aromatic monomers and one or more unsaturated compounds having electrophilic groups; at a temperature of about 200° C. to about 300° C. for a time period of about 0.5 to about 5 minutes wherein the copolymer of one or more vinylidene aromatic monomers and one or more unsaturated compounds containing nucleophilic groups is chain extended and or branched by the copolymer of one or more vinylidene aromatic monomers and one or more unsaturated compounds having electrophilic groups and the chain extended and/or branched copolymer is soluble in methylene chloride at 23° C. and exhibits a polydispersity of 3.0 or greater.

Embodiment 32 is a method according to Embodiment 31 wherein the copolymers of one or more vinylidene aromatic monomers and one or more unsaturated compounds having electrophilic groups is present in an amount of from about 0.05 to about 10 percent by weight of the mixture that is melt blended.

Embodiment 33 is a method of any one of embodiments 31 or 32 wherein the composition contains a salt of a transition metal, an alkali metal, an alkaline earth metal, a post transition metal or a metalloid.

Embodiment 34 is a method of Embodiment 33 wherein the metal is zinc, zirconium, aluminum, calcium, sodium, copper, magnesium or mixtures thereof.

Embodiment 35 is a method of any one of Embodiments 33 or 34 wherein the metal forms a salt with an acetate, carbonate, bicarbonate, (meth)acrylate, fumarate or mixtures thereof.

Embodiment 36 is a method of any one of embodiments 31 to 35 wherein the mole ratio of metal salts to nucleophilic groups on the copolymer of one or more vinylidene aromatic monomers and one or more unsaturated compounds containing nucleophilic groups is about 10:1 to about 1:10.

Embodiment 37 is a method of any one of embodiments 31 to 36 wherein the mole ratio of metal salts to nucleophilic groups on the copolymer of one or more vinylidene aromatic monomers and one or more unsaturated compounds containing nucleophilic groups is about 5:1 to about 1:5.

Embodiment 38 is a method of any one of embodiments 31 to 37 wherein the copolymers are melt blended at a temperature of about 200° C. to about 260° C. for a time period of about 0.5 to about 3.0 minutes.

Embodiment 39 is a method of any one of embodiments 31 to 38 wherein the metal salt is added to the melt blend at a concentration of about 50 ppm to about 5000 ppm based on the weight of the copolymers reacted.

Embodiment 40 is a method of any one of embodiments 31 to 39 wherein the copolymers are reacted under conditions such that the specific energy values are greater than 400 J/g or 700 J/g.

ILLUSTRATIVE EMBODIMENTS

The following examples are provided to illustrate the invention, but are not intended to limit the scope thereof. All parts and percentages are by weight unless otherwise indicated.

Ingredients

GPPS General purpose polystyrene—Styron 660 Polystyrene with a Melt Flow rate of 6.8 and a Mw of about 195 kg/mole.

SAA-100 Styrene Acrylic Acid copolymer containing 100 ppm by weight of Acrylic acid SAA-500 Styrene Acrylic Acid copolymer containing 500 ppm by weight of Acrylic acid SAA-2500 Styrene Acrylic Acid copolymer containing 2500 ppm by weight of Acrylic acid SAA-10000 Styrene Acrylic Acid containing 10000 ppm by weight of Acrylic acid SGMA-30 Styrene Glycidyl Methacrylate copolymer containing 30 percent by weight of glycidyl methacrylate—Joncryl Styrene Glycidyl Methacrylate 4400

SGMA-45 Styrene Glycidyl Methacrylate copolymer containing 45 percent by weight of glycidyl methacrylate Joncryl Styrene Glycidyl Methacrylate 4468

The SAA copolymers are prepared with the stated percentage of acrylic acid according to the procedure used to prepare Styron 660 Polystyrene.

Examples 1 to 12 Preparation of Chain Extended or Branched Copolymers

Blends containing either GPPS (control) or styrene acrylic acid copolymers with styrene glycidyl methacrylate copolymers are reacted in a Haake mini-extruder. A control of GPPS without styrene glycidyl methacrylate copolymers is used. In these experiments SGMA-45 is used. The blends are compounded at 260° C. for 5 minutes at 300 rpm. The products are prepared for molecular weight determination by dissolving 10 percent by weight of the products in tetrahydrofuran. For each sample the solubility of the product in methylene chloride is noted. In Table 1 the amounts of the components of the blends and the observations on solubility and evidence of crosslinking are noted. The molecular weights and polydispersity (MWD) are determined by GPC as described in the specification. In the Haake column; OK means that no signs of crosslinking are observed and XL means that the material did not come out of the die and, hence, crosslinking is expected. In the SOL column: SOL means completely soluble in THF; SOL! and SOL!!! mean that the sample is almost fully soluble, but still few small flocks are noticeable. The number of ! means the amount of flocks; GRAN means that the sample granule is still visible in the solution as a transparent particle, as a sign of a crosslinked material; and HAZY means that the solution is turbid through the presence of visible flocks in the solution.

TABLE 1

| EX | Acrylic acid (ppm) | SGMA (wt %) | Mw (kg/mole) | MWD | Mz (kg/mole) | Haake* | SOL** | Area in GPC (*$10^4$) |
|---|---|---|---|---|---|---|---|---|
| 1 | 0 | 0 | 201 | 2.82 | 353 | OK | SOL | 1.01 |
| 2 | 0 | 0 | 135 | 2.87 | 244 | OK | SOL | 1.05 |
| 3 | 0 | 2 | 108 | 3.04 | 203 | OK | SOL | 1.06 |
| 4 | 100 | 2 | 158 | 3.16 | 301 | OK | SOL!!! | 1.03 |

TABLE 1-continued

| EX | Acrylic acid (ppm) | SGMA (wt %) | Mw (kg/mole) | MWD | Mz (kg/mole) | Haake* | SOL** | Area in GPC (*10⁴) |
|---|---|---|---|---|---|---|---|---|
| 5 | 500 | 0.5 | 120 | 4.38 | 274 | XL | GRAN | 0.34 |
| 6 | 500 | 1 | 172 | 4.71 | 503 | XL | HAZY | 0.77 |
| 7 | 500 | 2 | 147 | 3.42 | 328 | XL | GRAN | 0.45 |
| 8 | 2500 | 0 | 145 | 3.07 | 280 | OK | SOL | 1.03 |
| 9 | 2500 | 0.5 | 158 | 5.27 | 459 | XL | HAZY | 0.68 |
| 10 | 2500 | 2 | 35 | 2.46 | 66 | XL | GRAN | 0.12 |
| 11 | 500 | 0.1 | 177 | 4.34 | 434 | OK | SOL | 1.00 |
| 12 | 500 | 0.2 | 194 | 3.69 | 501 | OK | SOL! | 0.92 |

Figure 1:
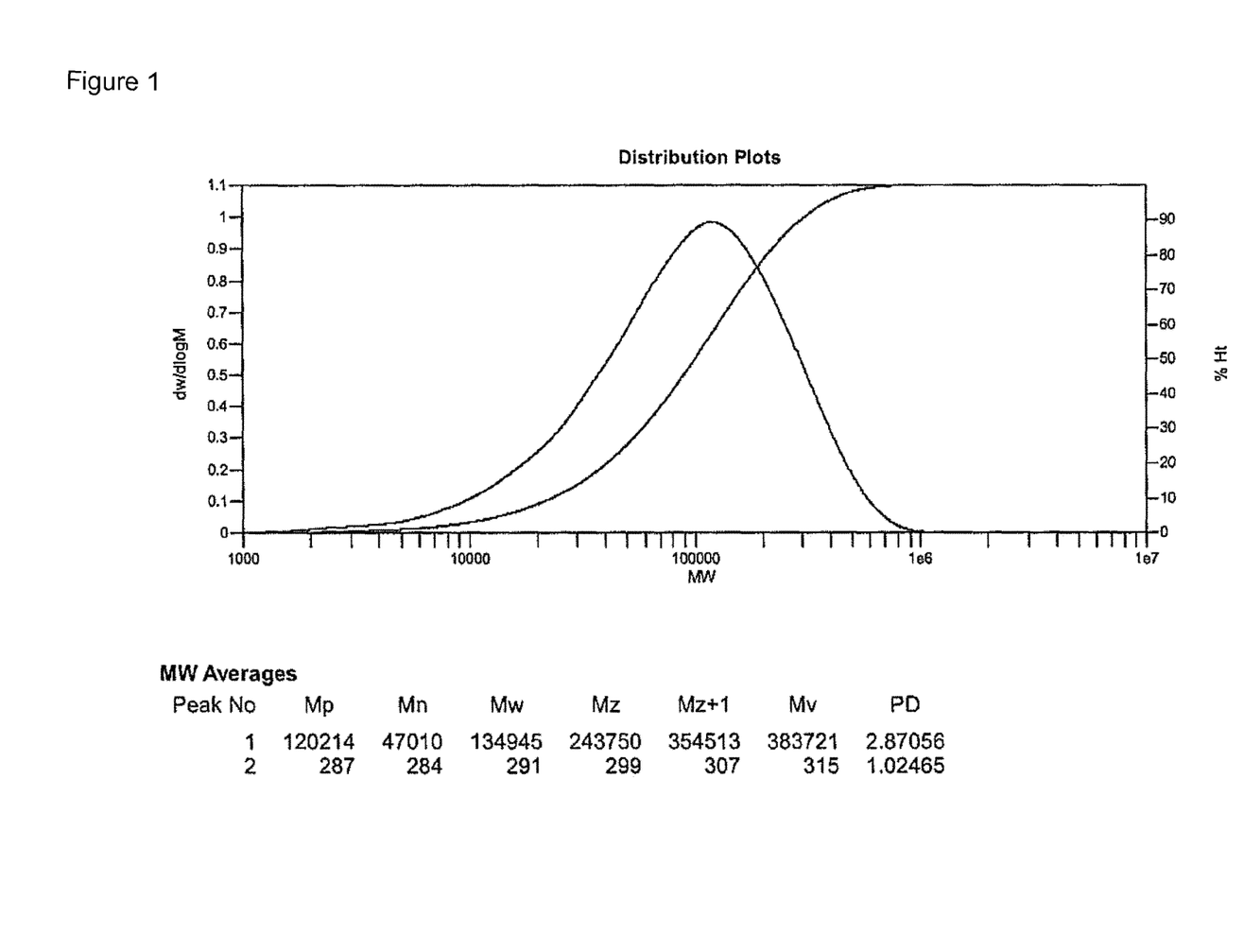
FIG. 1 is a GPC curve of general purpose polystyrene.
Figure 2:
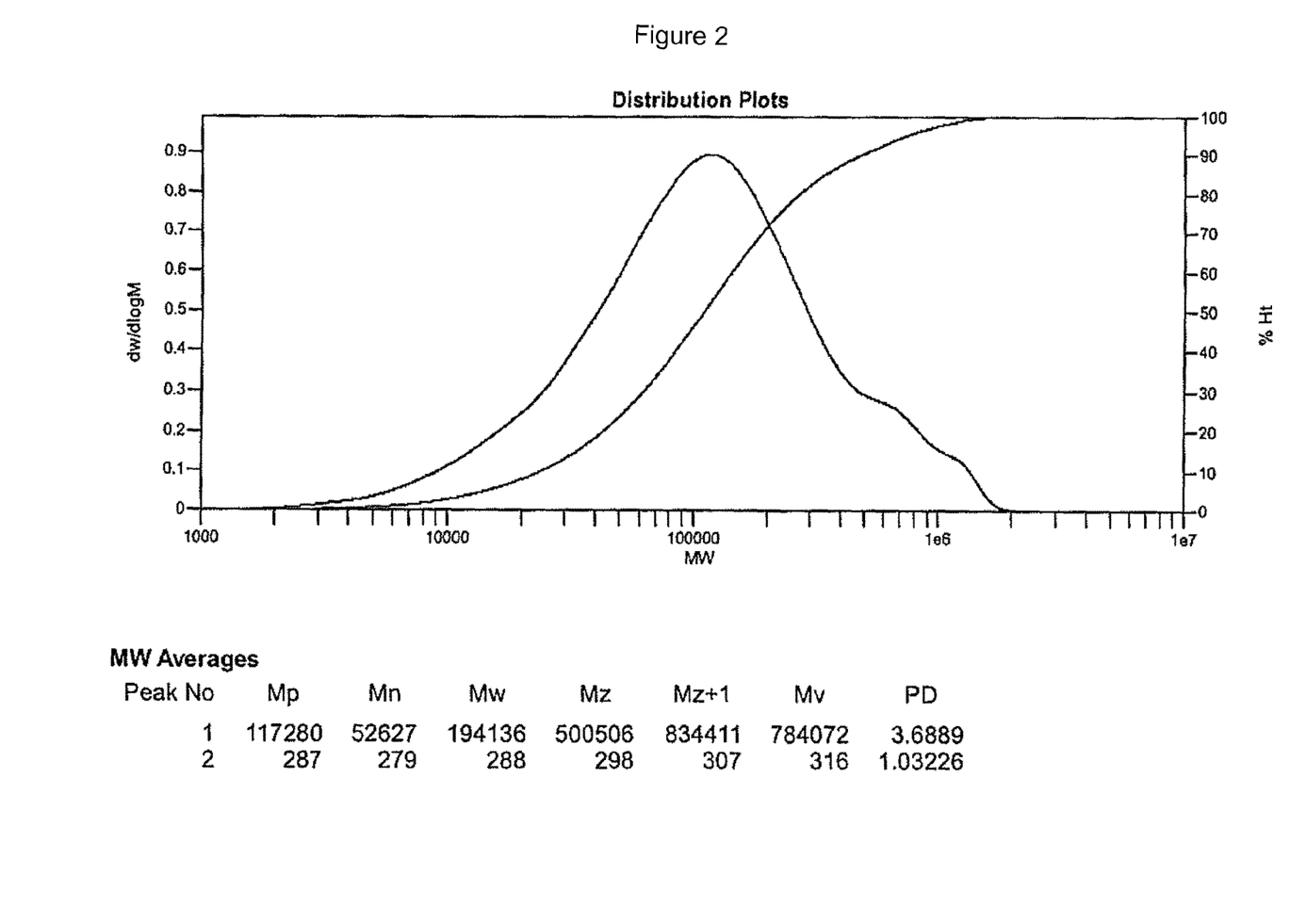
FIG. 2 is a GPC curve of chain extended and or branched copolymers.

The GPC curves of Examples 2 and 12 are reproduced in FIGS. 1 and 2. This compares GPPS, with SAA (AA:500 ppm)+SGMA (0.2 wt %). From the areas under the GPC curve, it can be estimated how much of the sample has become insoluble. This means that the amount that has 'disappeared' is to be considered as crosslinked material. There is a perfect correlation between the observations in the Haake, the observed solubility in the GPC sample preparation and the area reduction. When this calculated Area is below 0.80, it is concluded that some part of the polymer is cross-linked. In such case, the polymer is not fully soluble any longer.

Examples 12 to 14—Preparation of Chain Extended or Branched Copolymers at Varied Residence Times Experiments as described above are performed with different residence times in the Haake mini-extruder. The ingredients and results are compiled in Table 2.

TABLE 2

| Example | Residence time Minutes | Acrylic acid (ppm) | SGMA (wt %) | Mw (kg/mole) | MWD | Mz (kg/mole) | Haake* | SOL** | Area in GPC (*10⁴) |
|---|---|---|---|---|---|---|---|---|---|
| 12 | 5' | 500 | 0.2 | 194 | 3.69 | 501 | OK | SOL! | 0.92 |
| 13 | 1' | 500 | 0.2 | 238 | 3.90 | 672 | OK | SOL! | 1.01 |
| 14 | 3' | 500 | 0.2 | 212 | 3.94 | 613 | OK | SOL! | 0.83 |

The data shows that the Mw does not change significantly, but the Mz does, while all polymer is still fully soluble, hence not crosslinked. These examples show that when the appropriate levels of acrylic acid in the SAA copolymer are used with the appropriate concentration of GMA in the SGMA copolymers and the optimal compounding conditions are used in terms of temperature, residence time and specific energy, then branched or chain extended copolymers are obtained with multimodal molecular weight distributions having much higher Mz values compared to 'typical' GPPS resins. Such resins have a differentiated performance in XPS foam applications.

What is claimed is:

1. A composition comprising one or more chain extended and/or branched copolymers which is the product of
    one or more first copolymers of one or more vinylidene aromatic monomers and one or more unsaturated compounds containing on average about 0.02 to about 3.0 percent by weight of nucleophilic groups pendant from the first copolymer, and
    one or more second copolymers of one or more vinylidene aromatic monomers and one or more unsaturated compounds having electrophilic groups,
    wherein the one or more first copolymers of one or more vinylidene aromatic monomers and one or more unsaturated compounds containing nucleophilic groups are chain extended and/or branched by the one or more second copolymers of one or more vinylidene aromatic monomers and one or more unsaturated compounds having electrophilic groups as a result of formation of bonds by all or a portion of the nucleophilic groups of the first copolymer with all or a portion of the electrophilic groups of the second copolymer,
    wherein the one or more chain extended and/or branched copolymers are soluble in methylene chloride at 23° C. and exhibit a polydispersity of 2.5 or greater.

2. The composition according to claim 1 wherein the one or more chain extended and/or branched copolymers contain from about 0.1 to about 0.5 percent by weight of the one or more second copolymers of one or more vinylidene aromatic monomers and one or more unsaturated compounds having electrophilic groups, wherein the electrophilic groups are pendant from the one or more second copolymers.

3. The composition of claim 1 wherein the nucleophilic groups are carboxylate, carboxylic acid, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

4. The composition of claim 1, wherein the nucleophilic groups are carboxylic acid groups and the electrophilic groups are one or more of epoxide groups.

5. The composition of claim 1, wherein the Mz of the one or more chain extended and/or branched copolymers is from about 300 kg/mole to about 1,000 kg/mole and the Mw is from about 100 kg/mole to about 400 kg/mole.

6. The composition of claim 1, wherein the one or more first copolymers of one or more vinylidene aromatic monomers and one or more unsaturated compounds containing a nucleophilic group contains from about 0.5 to about 1.5 percent by weight nucleophilic groups.

7. The composition of claim 1, wherein the melt viscosity at 0.314 s$^{-1}$ angular frequency of the one or more chain extended and/or branched copolymers is at least 10 percent higher than the melt viscosity of one or more first copolymers without branching and chain extension when measured at 220° C.

8. The composition of claim 1, wherein the nucleophilic groups are carboxylic acid groups.

9. A method of preparing a composition according to claim 1, comprising:

melt blending one or more first copolymers of one or more vinylidene aromatic monomers and one or more unsaturated compounds containing nucleophilic groups, the copolymer having on average about 0.02 to about 3.0 percent by weight of nucleophilic groups pendant from the copolymer, with one or more second copolymers of one or more vinylidene aromatic monomers and one or more unsaturated compounds having electrophilic groups; at a temperature of about 200° C. to about 300° C. for a time period of about 0.5 to about 5 minutes wherein the first copolymer of one or more vinylidene aromatic monomers and one or more unsaturated compounds containing nucleophilic groups is chain extended and/or branched by the second copolymer of one or more vinylidene aromatic monomers and one or more unsaturated compounds having electrophilic groups to form the one or more chain extended and/or branched copolymer which is soluble in methylene chloride at 23° C. and exhibits a polydispersity of 3.0 or greater.

10. The method of claim 9, wherein the one or more first copolymers and one or more second copolymers are melt blended at a temperature of about 200° C. to about 260° C. for a time period of about 0.5 to about 3.0 minutes to form a melt blend, and a metalloid or a metal salt is added to the melt blend at a concentration of about 50 ppm to about 5000 ppm based on the weight of the copolymers and the copolymers are reacted under conditions such that the specific energy values are greater than 400 J/g.

11. The composition of claim 1, wherein the polydispersity is about 3.2 or greater.

12. The composition of claim 1, wherein the composition comprises a continuous matrix containing the chain extended and/or branched copolymer and a dispersed phase comprising an impact modifier.

13. The composition of claim 12, wherein the dispersed phase comprises particles of about 0.05 to about 6.0 microns.

14. A composition comprising:
a) from about 90 to about 99.9 weight percent of one or more first copolymers of one or more vinylidene aromatic monomers and one or more unsaturated compounds containing nucleophilic groups, the copolymer having on average about 0.02 to about 3.0 percent by weight of nucleophilic groups pendant from the copolymer; and
b) from about 0.1 to about 10.0 weight percent of one or more second copolymers of one or more vinylidene aromatic monomers and one or more unsaturated compounds having electrophilic groups.

15. The composition of claim 14 comprising:
from about 0.1 to about 0.5 percent of one or more second copolymers of one or more vinylidene aromatic monomers and one or more unsaturated compounds having pendant electrophilic groups.

16. The composition of claim 14, wherein the nucleophilic groups are one or more of carboxylic acid, carboxylate, alcohol, phenol, amine, aniline, imidazole, tetrazole, thiol, boronic acid, glycol, hydrazine and hydroxyl amine groups and the electrophilic groups are one or more of epoxide, anhydride, imide, ester, acyl halide, acyl nitrile, aldehyde, ketone, isocyanate and isothiocyanate groups.

17. The composition of claim 14, wherein the composition contains a metal salt comprises a salt of a transition metal, an alkali metal, an alkaline earth metal, or a post transition metal.

18. The composition of claim 17, wherein the mole ratio of metal salts to nucleophilic groups on the first copolymer of one or more vinylidene aromatic monomers and one or more unsaturated compounds containing nucleophilic groups is about 20:1 to about 1:20.

19. The composition of claim 14, comprising one or more impact modifiers.

20. The composition of claim 14, wherein the electrophilic groups are one or more of epoxide, anhydride, imide, ester, acyl halide, acyl nitrile, aldehyde, ketone, isocyanate and isothiocyanate groups.

* * * * *